Sept. 17, 1963 N. A. SHEALY ETAL 3,103,997
FLUID RETARDER SYSTEM

Filed Jan. 9, 1961 9 Sheets-Sheet 3

INVENTORS
NOAH A. SHEALY
WAYNE R. HOWARD
BY
Kenneth C. Witt
ATTORNEY

Sept. 17, 1963 N. A. SHEALY ETAL 3,103,997
FLUID RETARDER SYSTEM
Filed Jan. 9, 1961 9 Sheets-Sheet 5
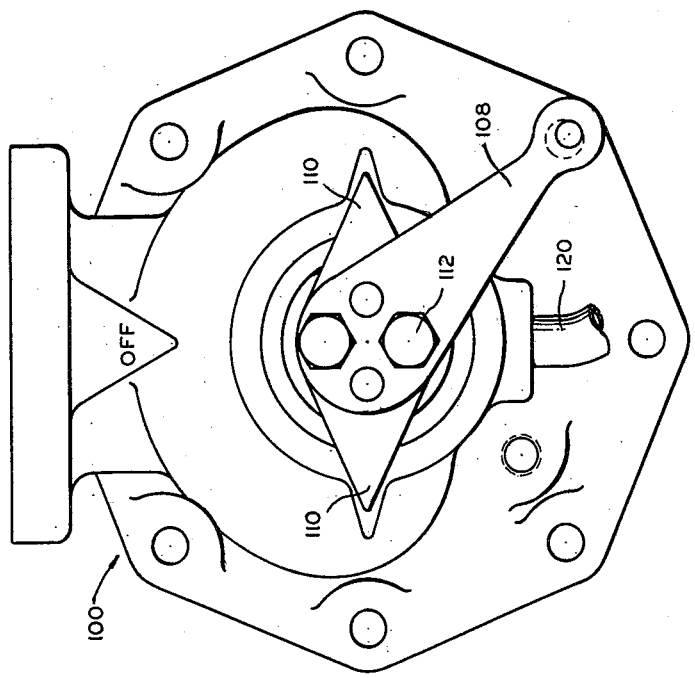
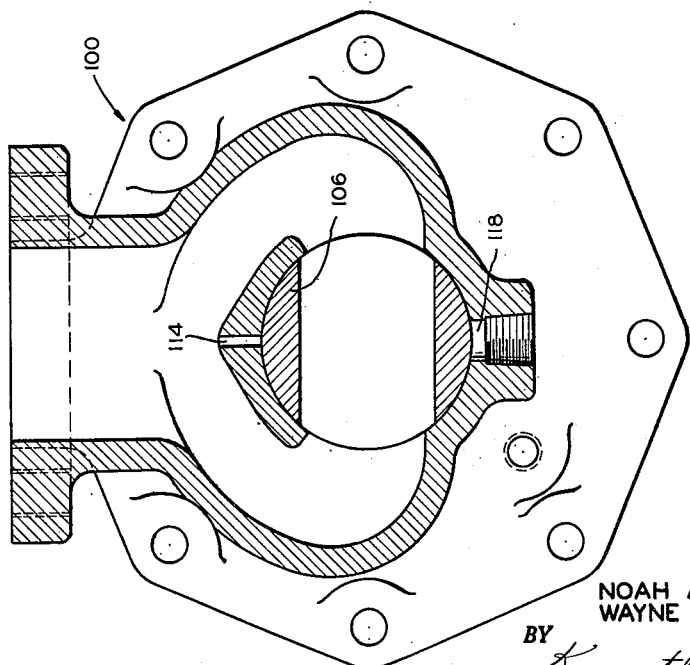
INVENTORS.
NOAH A. SHEALY
WAYNE R. HOWARD
BY
Kenneth C. Witt
ATTORNEY Sept. 17, 1963 N. A. SHEALY ETAL 3,103,997
FLUID RETARDER SYSTEM
Filed Jan. 9, 1961 9 Sheets-Sheet 6

INVENTORS.
NOAH A. SHEALY
WAYNE R. HOWARD
BY Kenneth C. Witt
ATTORNEY

Sept. 17, 1963 N. A. SHEALY ETAL 3,103,997
FLUID RETARDER SYSTEM
Filed Jan. 9, 1961 9 Sheets-Sheet 9

INVENTORS
NOAH A. SHEALY
WAYNE R. HOWARD
BY
Kenneth C. Witt
ATTORNEY

United States Patent Office 3,103,997
Patented Sept. 17, 1963

3,103,997
FLUID RETARDER SYSTEM
Noah A. Shealy and Wayne R. Howard, Jackson, Mich., assignors to Clark Equipment Company, a corporation of Michigan
Filed Jan. 9, 1961, Ser. No. 81,482
7 Claims. (Cl. 192—4)

This invention relates to auxiliary braking systems, and more particularly to such systems which utilize fluid friction devices to accomplish braking.

The present invention utilizes vaned "wheel" elements which are similar to those employed in so-called fluid couplings or fluid clutches. One or more such elements are held stationary while one or more additional elements rotate in close proximity to the first-mentioned element or elements respectively. When there is no liquid present in the device, there is no braking action, but when liquid is admitted the action produced by the rotating and stationary elements forcing the liquid back and forth between them produces a braking or retarding action. This hydrodynamic brake or retarder is to be distinguished from the so-called hydraulic brakes or air brakes which are commonly employed as the service brakes on vehicles, in which the fluid merely provides the power means for actuating the shoes, discs or other friction elements which provide the actual braking action.

It has long been a problem with some vehicles and particularly with respect to large, heavy duty vehicles to provide sufficient braking under adverse conditions, such as on long downhill grades, without enlarging the service brakes sufficiently to take the entire braking load. Even assuming that it is possible so to enlarge the service brakes, which is not always the case because of space limitations, such a course frequently is undesirable because in order to provide service brakes that are sufficiently large to avoid overheating and other deleterious occurrences during abnormal conditions such as operation down long grades, the service brakes would be much more costly and generally much larger than would be required for normal operation of the vehicle. Various auxiliary braking arrangements have been employed in attempts to solve this problem, including using the engine as a brake, fluid retarder systems, and others.

The object of the present invention is to provide a fluid retarder type auxiliary braking system which is so interrelated with the drive line components of the vehicle as to minimize the space required and costs of the auxiliary braking system, and in addition to provide such a system which is easily manufactured, installed and maintained and which is rugged and reliable in operation.

A further object of the present invention is to provide an auxiliary braking system which operates through the transmission gearing so that the braking effort is multiplied in accordance with the gear ratio in effect in the transmission.

In carrying out our invention in one form, we provide a transmission which includes a casing adapted to contain fluid that is used both for lubricating the transmission and as the braking fluid in a fluid retarder. The fluid retarder is mounted on the transmission casing and a pump and heat exchanger are also provided. The pump is arranged to draw fluid from the transmission casing and the outlet of the pump is connected to the heat exchanger while the outlet of the retarder also is connected to the inlet of the heat exchanger. Additional conduits are provided which connect the outlet of the heat exchanger to the inlet of the fluid retarder and also back to the casing of the transmission.

For a clearer and more complete understanding of our invention reference should be had to the accompanying drawing in which:

FIGURE 5 is an enlarged front elevational view of the control valve for the fluid retarder in the on or open position;

FIGURE 6 is a transverse sectional view of the control valve along the line 6—6 of FIG. 2 with the valve in the open position;

Figure 1:
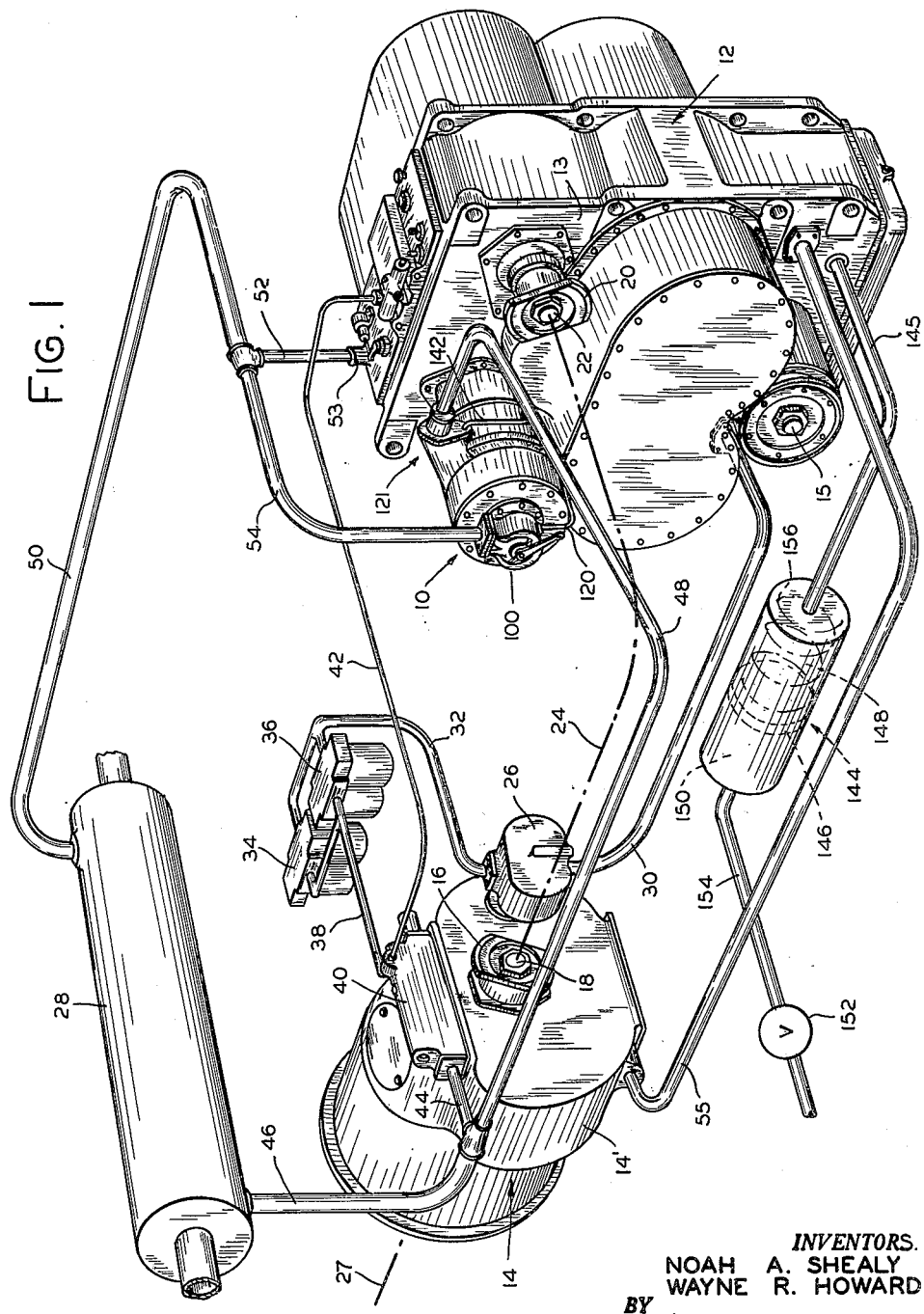
FIGURE 1 is a partially schematic perspective view of an assemblage of mechanisms embodying the present invention.
Figure 11:
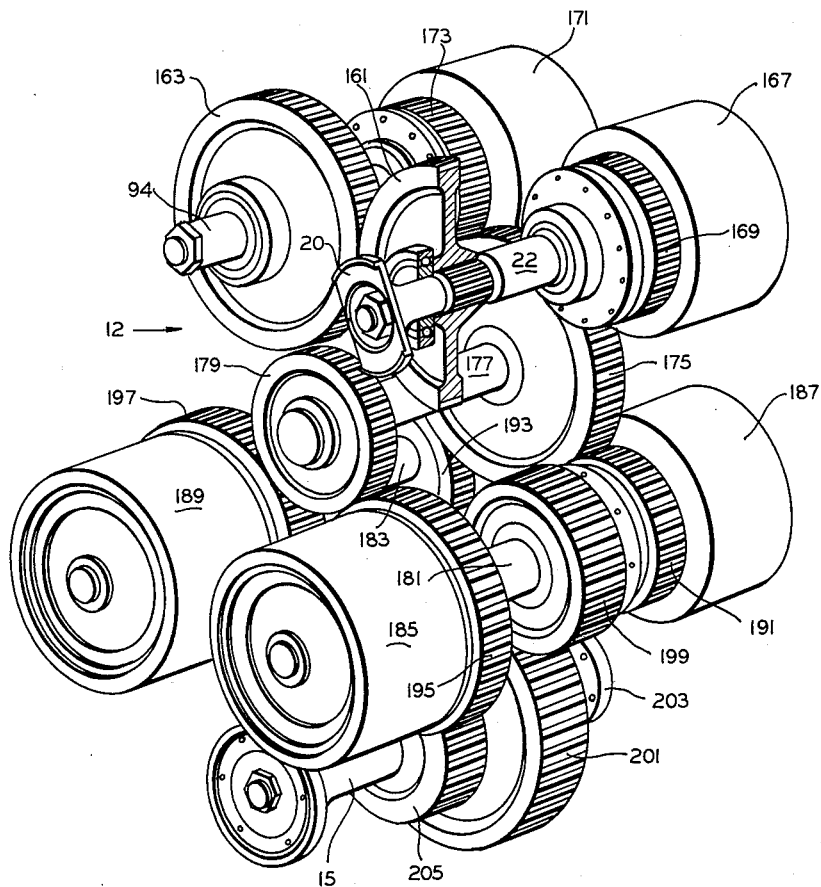
FIGURE 11 is a semi-schematic perspective view of the internal mechanism of the transmission illustrated in FIG. 1, with certain of the parts shown in section.

Referring to FIG. 1 of the drawing, we have indicated generally by the numeral 10 a fluid retarder which is mounted on the front casing wall 13 of a transmission which is indicated by the numeral 12. Transmission 12 as illustrated is of the constant mesh gear type having fluid operated multiple disc clutches for selectively providing a plurality of gear ratios for both directions of operation, and more details in connection with this specific transmission may be obtained by reference to co-pending application Serial No. 79,365, filed December 29, 1960, which is assigned to the same assignee as the present application. It will be appreciated that the present invention is not limited to this specific transmission. The gears, clutches, shafts and other internal parts of the transmission illustrated are shown in more detail in the perspective view of FIGURE 11. In FIGURE 11 will be observed an input shaft 22 which has a half coupling member 20 mounted thereon. Input shaft 22 carries a gear 161 splined or otherwise secured thereto which meshes with a gear 163 which is secured to and rotates reverse shaft 94. This is the shaft to which shaft 88 of the fluid retarder is connected, as described in detail hereinafter. A clutch 167 may be selectively actuated to connect a gear 169 for rotation with input shaft 22, while a clutch 171 may be selectively actuated to connect a gear 173 for rotation with the reverse shaft 94. Both gears 169 and 173 are constantly in mesh with a gear 175 which is secured to and rotates an idler shaft 177. The shaft 177 also has another gear 179 secured at the front end thereof which rotates when gear 175 and shaft 177 rotate. Two so-called intermediate shafts are provided and these are indicated by the numerals 181 and 183. Each of these shafts has clutches at both ends, the clutch at the front end of shaft 181 being designated 185 while the clutch at the rearward end of this shaft is designated 187. Shaft 183 has clutch 189 at the front end and at the other end another clutch which is not visible in FIGURE 11. The gear 175 on idler shaft 177 is in constant mesh with gear 191 which may be selectively connected by clutch 187 to shaft 181, and also with a gear 193 which may be selectively clutched to shaft 183 by the rearward clutch on this shaft. Similarly at the front of the transmission, gear 179 on the idler shaft is in constant mesh with a gear 195 which may be selectively connected by clutch 185 to shaft 181, while a gear 197, also in constant mesh with gear 179, may be selectively connected by clutch 189 to shaft 183. Mounted on shaft 181 for rotation therewith is a gear 199. Gear 199 is in constant mesh with a gear 201 which is secured to output shaft 203. Another gear (not visible) is mounted on shaft 183 and is in constant mesh with a gear 205 which likewise is mounted on output shaft 203. Output shaft 203 is adapted for coupling to a propeller shaft for operating the rear wheels of a vehicle or other device to be operated by the transmission. The transmission illustrated has an optional output shaft 15 projecting from the front which may be used to operate the front wheels of a vehicle if four wheel drive is desired. The transmission 12 provides for the operation of the output shaft from the input shaft 22 in either direction at a selected one of a plurality of gear ratios.

The numeral 14 on the drawing indicates generally a hydrodynamic torque converter of the type disclosed in co-pending application Serial No. 778,763, Howard, filed December 8, 1958, which is assigned to the assignee of the present application. The torque converter has three bladed wheels, namely, an impeller, a turbine and a reaction member forming a fluid containing toroidal chamber, all within the housing 14'. A half coupling 16 is mounted on shaft 18 which is connected to the turbine of the torque converter, and in operation half coupling 16 is connected to half coupling member 20 on the input shaft 22 of the transmission whereby the torque converter drives the transmission input shaft. The torque converter and transmission have been illustrated in FIG. 1 at a 90° angle to each other in order better to show the individual components of the system, but it will be appreciated, as indicated schematically by the line 24, the half couplings 16 and 20 actually are joined directly whereby the torque converter and transmission are closely coupled.

The system also includes a pump 26 which, as illustrated, is driven through an internal gear mechanism (not shown) in the housing 15 of converter 14. The torque converter is driven by an engine or other source of power, as indicated schematically by the line 27; and it is common to provide gear reduction means in connection with a torque converter such as 14 to operate auxiliary devices such as pump 26, although it will be appreciated that it is not essential that pump 26 be mounted on torque converter 14 or driven by the same engine which drives the torque converter. The system also includes a heat exchanger 28 and conduits and other parts which are described in detail hereinafter.

Figure 12:
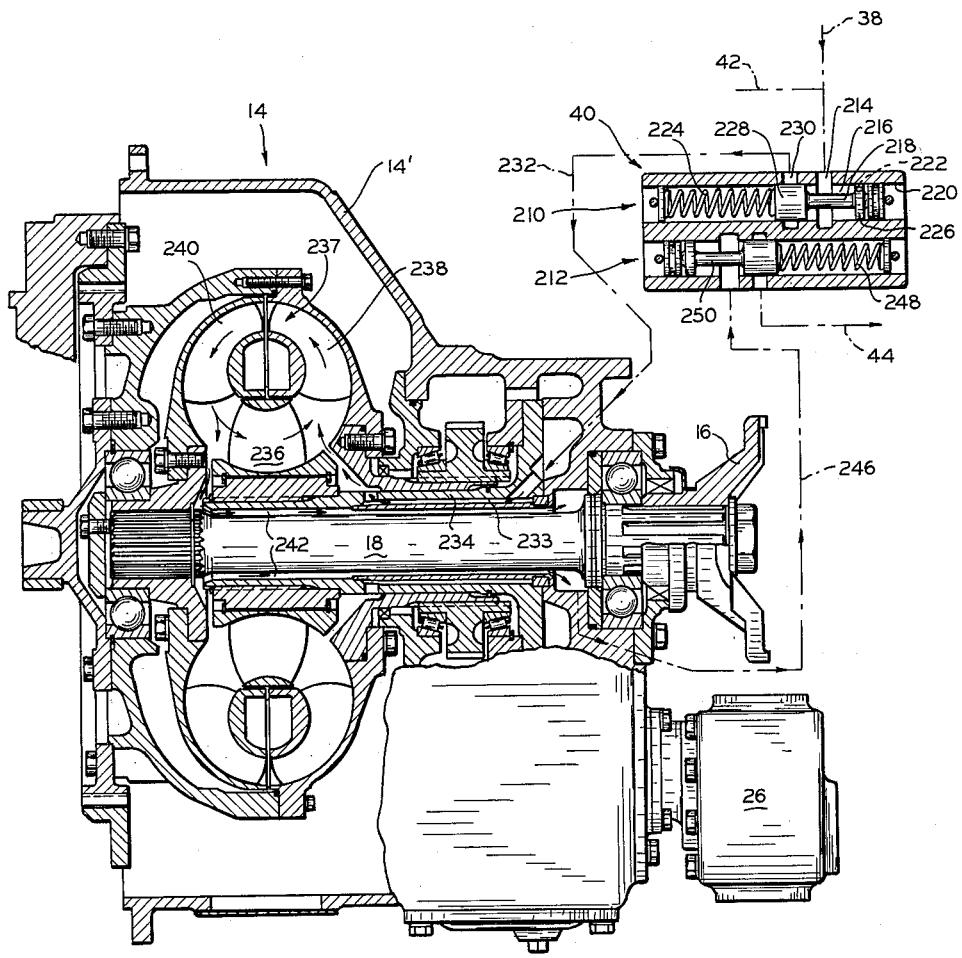
FIGURE 12 is a longitudinal vertical sectional view of the torque converter shown in FIG. 1, including a schematic illustration of the pressure regulator mechanism associated therewith.

The casing 13 of transmission 12 serves as a reservoir for the liquid which is used as the lubricant in the transmission, as the torque transferring medium in the fluid retarder, and also as the torque transferring medium in the torque converter. Such fluid is drawn from the bottom of the transmission casing 13 by pump 26 through suction line or conduit 30 and is discharged from the pump under pressure through line 32. After passing through filters 34 and 36 which are of conventional type the fluid flows through conduit 38 into pressure regulator mechanism 40 mounted on the casing 15 of the torque converter 14. The regulator 40 is of the type which is disclosed in detail in the aforementioned application Serial No. 778,763. The regulator is in two parts, one part being a high pressure regulator portion which provides a supply of pressurized fluid at relatively high pressure which may be 200 lbs. per sq. in. for example, which passes through conduit 42 to transmission 12 and is utilized in the transmission for actuating the clutches therein. The fluid which is released in maintaining the said higher regulated pressure passes through the torque converter chamber and then comes back to the regulator where another low pressure regulator portion maintains the pressure in the torque converter chamber at a lower regulated pressure which may be, for example, 50 lbs. per sq. in. As shown schematically in FIG. 12, the high pressure regulator portion is indicated generally by the reference numeral 210, while the other low pressure regulator portion is indicated generally by the numeral 212. Conduit 38 communicates with a passage 214 which directs pressurized fluid from conduit 38 into an annular chamber 216 surrounding a spool member 218 which is movable in a bore 220. Pressurized fluid from chamber 216 passes through a small opening 222 in the land portion 226 at the right end of spool 218 and by exerting a force on the right end of the spool member urges it to the left against the force of a compression spring 224. The spring 224 is selected so that when the pressure in chamber 216 reaches a predetermined amount which may be, for example, 200 lbs. per sq. in., the spring 224 is compressed sufficiently that left hand portion 228 on the spool member uncovers port 230 and allows the discharge of excess fluid through a conduit which is indicated schematically by the numeral 232. From this conduit the fluid follows the path indicated by the arrows, through a longitudinal passageway 233 in a reactor sleeve 234 in the torque converter which supports bladed reactor member 236 in the toroidal chamber 237 of the torque converter. The fluid circulates through the chamber 237, through the bladed impeller member 238 and the bladed turbine member 240 therein. A portion of the fluid recirculates in the chamber 237 and another portion is discharged continuously from the chamber through the path indicated by the arrows, through an annular passage 242 surrounding turbine shaft 18 from which it flows through a conduit 246 back to low pressure portion 212 of the regulator. This portion of the regulator works the same as portion 210 except that the spring 248 thereof is adapted to maintain a lower pressure which may be, for example, 50 lbs. per sq. in. in the torque converter chamber 237 in order to keep the chamber full of fluid at all times. As the spool member 250 of the low pressure regulator 212 is moved to the right against the force of spring 248, fluid is discharged through conduit 44 to maintain the desired pressure in the torque converter. The discharge from the low pressure regulator portion 212 passes through conduit 44 to conduit 46 which directs the fluid into the heat exchanger 28. A conduit 48 also conducts fluid from the discharge or outlet of the fluid retarder 10 to the conduit 46 and thence into the heat exchanger. After the fluid passes through the heat exchanger, which may have a suitable cooling fluid circulating therethrough to cool the fluid employed in the present system, the last-mentioned fluid flows through conduit 50 which supplies two other conduits; one is conduit 52 which directs a portion of the fluid in conduit 50 continuously to the transmission 12 for lubricating and cooling the working parts thereof, while another conduit 54 leads from conduit 50 to the inlet of the fluid retarder 10. An additional relief or pressure regulating valve 53, which is shown in conduit 52, maintains a third regulated pressure which may be, for example, 25 lbs. per sq. in. in conduits 52 and 54 and also in conduit 50, in the heat exchanger and in conduits 46, 44 and 48 ahead of the heat exchanger. In other words the entire circulation system from and back to the retarder through the heat exchanger is supercharged at a predetermined pressure. The valve 53 preferably is a simple spring loaded relief valve which discharges sufficient liquid into the transmission casing to maintain a back pressure of 25 lbs. per sq. in. or other desired pressure. The valve 53 may be located physically inside the transmission casing if desired. The pressurized liquid in conduit 52 is utilized to lubricate the bearings and cool the clutches in transmission 12, such lubricating and cooling liquid draining by gravity back to the sump in the bottom of the casing 13 after it passes through the respective bearings and clutches.

The conduit 55 is merely a gravity drain from the torque converter casing 15 back to transmission casing 13.

Figure 2:
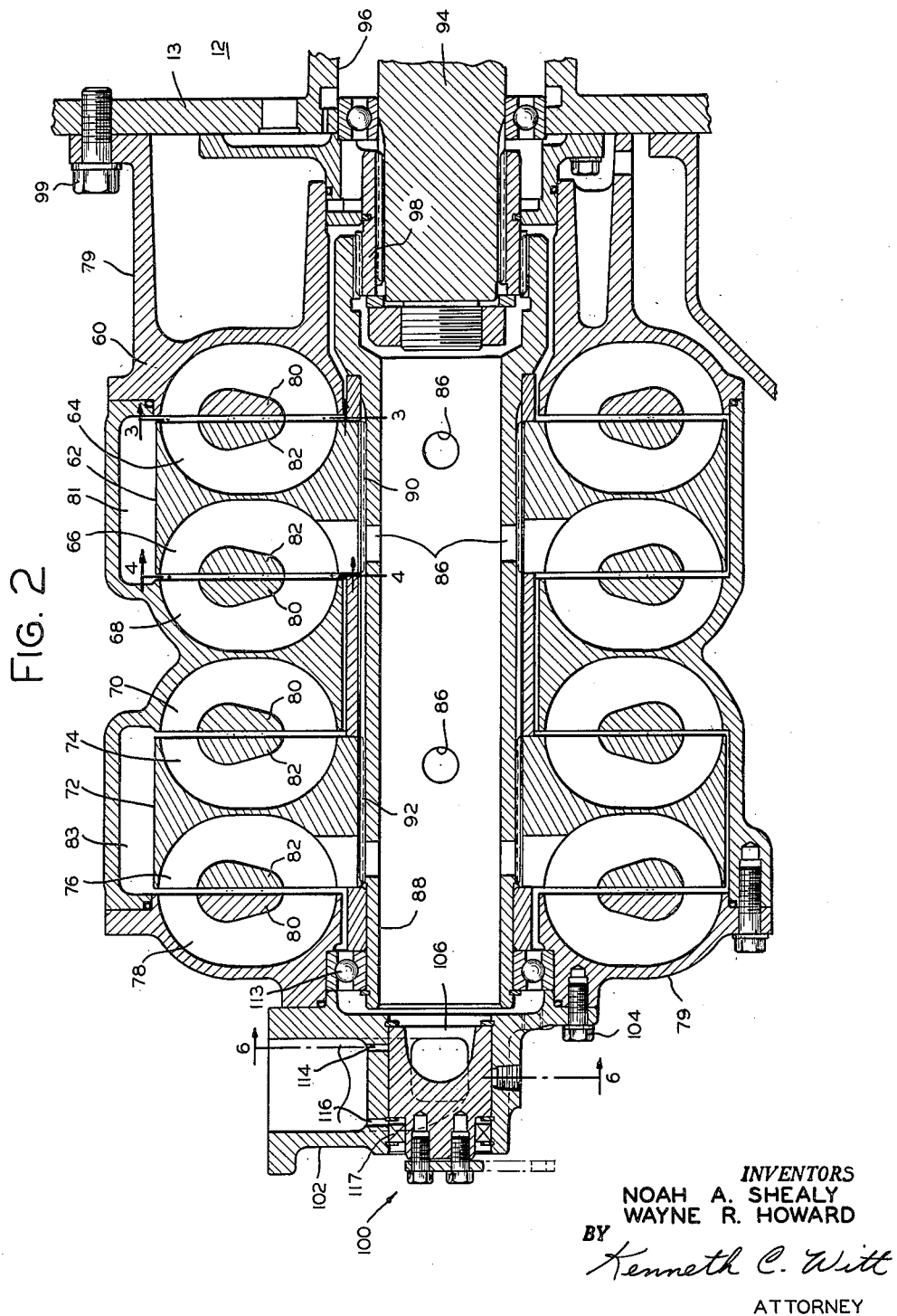
FIGURE 2 is a longitudinal sectional view through the fluid retarder of FIG. 1.
Figure 3:
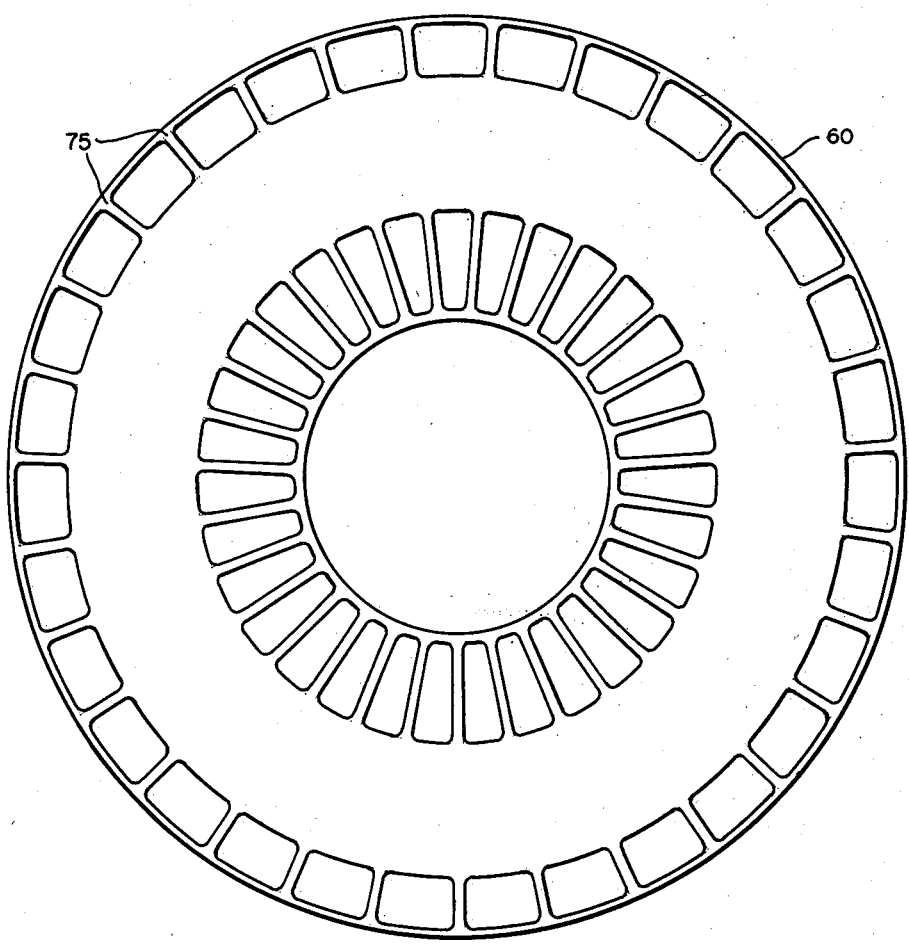
FIGURE 3 is a transverse sectional view through the fluid retarder along the line 3—3 of FIG. 2.
Figure 4:
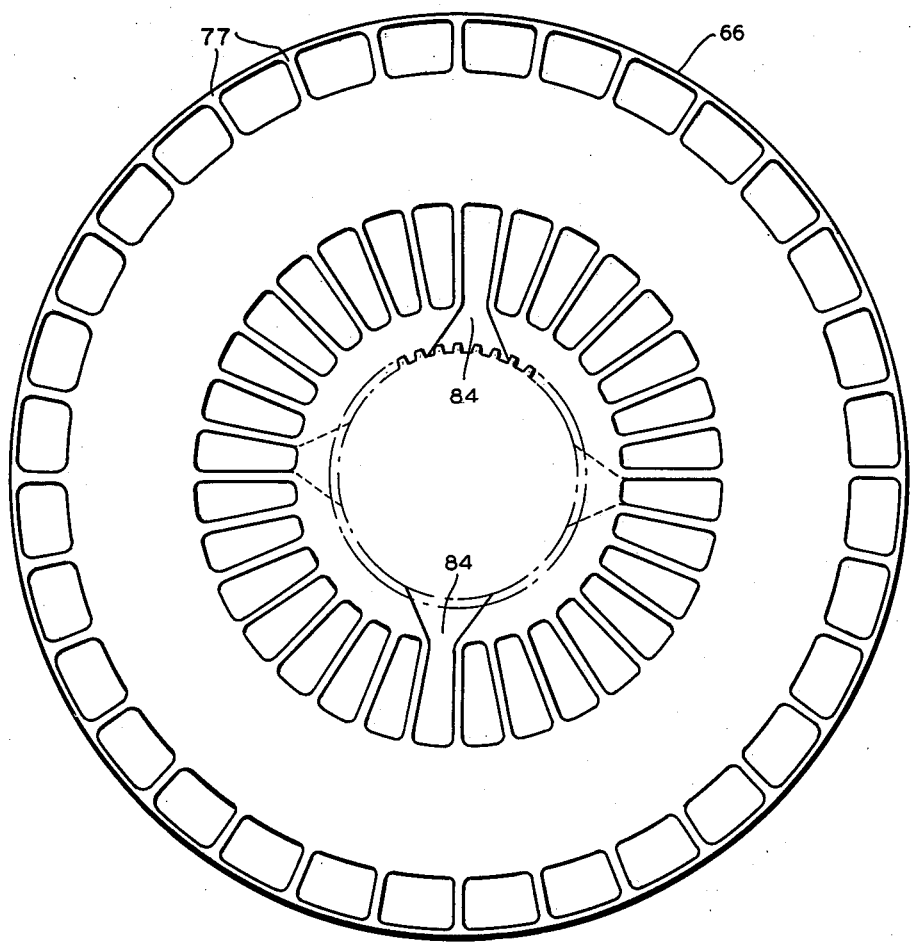
FIGURE 4 is a transverse sectional view through the fluid retarder along the line 4—4 of FIG. 2.

FIGS. 2, 3 and 4 illustrate the functional parts of the hydrodynamic fluid retarder in greater detail. As may be seen in FIG. 2, the retarder described and illustrated herein actually is a combination of four individual retarder units working in unison and each comprising a stator member and a coacting rotor member. It is not necessary always to multiply the retarder hydrodynamic elements in this manner and in some cases a lesser number of pairs of rotors and stators such as two or one is sufficient. The transmission, retarder and other parts described and illustrated herein were designed to accommodate a torque input from the torque converter to the transmission of 1600 ft. lbs. and for this size mechanism the multiple of four retarder units was found necessary. It will be recognized by those skilled in the art that a drive line having components of the magnitude of these is suitable for a large, heavy truck or other very heavy vehicle.

As illustrated, the retarder comprises a first bladed stator portion 60 and a first rotor portion 62 which has two sets of blades 64 and 66. The blades 64 confront and coact with stator blades 60 to form a first retarder unit. The other set of rotor blades 66 confront and coact with additional stator blades 68 to form a second retarder unit. Outwardly of the retarder structure just described, the same structure is duplicated approximately, including a third set of stator blades 70, a second rotor 72 having rotor blades 74 confronting and coacting with stator blades 70 to form a third retarder unit; also a fourth set of blades 76 on rotor 72 coacting with a fourth set of stator blades 78 to form a fourth retarder unit. Each of the four stator sections is connected to or formed integrally with the housing 79 of the retarder.

Each of the eight stator and rotor sections comprises a plurality of radially extending blades in an annular chamber which is approximately semi-circular in cross-section. FIG. 3 is an end view of stator 60 and it will be observed that this stator is equipped with thirty-one such blades 75. Each of the other stator sections has the same number of blades. As shown by FIG. 4, which shows rotor section 66, each of the bladed rotor sections has thirty-two similar blades 77. The confronting bladed portions of the rotor and stator section of each retarder unit form pockets, thirty-one in the stator and thirty-two in the rotor, which provide for a toroidal circulation of fluid in each of the retarder units, which toroidal flow is guided and facilitated by core or torus rings 80 and 82 on each of the stators and rotors respectively.

As shown in FIG. 4 two of the pockets between blades of each rotor section are connected with cutout portions 84 which communicate with transverse openings 86 in the hollow shaft 88 of the fluid retarder to provide for admission of fluid to the individual fluid retarder units. As seen in FIG. 2, the rotors 62 and 72 are suitably connected such as by splines 90 and 92 respectively to the shaft 88 for rotation therewith. The shaft 88 is connected to a shaft 94 which forms a portion of the transmission 12 and projects outwardly through an opening 96 in the casing 13 of the transmission. The shafts 94 and 88 are connected in this typical case by means of a double splined connection through an intervening collar member 98. The housing 79 of the retarder is secured to the transmission casing in a suitable manner such as by a plurality of machine screws 99. In the typical transmission illustrated in co-pending patent application Serial No. 79,365 referred to previously the shaft 94 is the reverse shaft of the transmission, and this reverse shaft may be interconnected by constant mesh gearing with the transmission output shaft.

Figure 7:
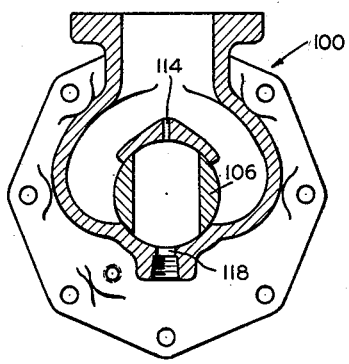
FIGURE 7 is a view the same as FIG. 6 except with the valve in the closed or off position.

The fluid inlet valve for the retarder is indicated generally by the numeral 100 in FIG. 1 and is shown in detail in FIGS. 2, 5, 6, 7 and 8. The valve 100 includes a casing portion 102 which is secured in a suitable manner such as by machine screws 104 to the housing 79 of the fluid retarder. The valve 100 is of the rotary type and includes a cock member 106 which is arranged to be turned through an angle of 90° to move it between the on (open) and off (closed) positions and to an infinite number of intermediate operating positions. The cock 106 is shown in FIGS. 2, 5 and 6 of the drawing in the open or on position, while FIG. 7 shows the off position and FIG. 8 an intermediate position. An operating lever 108 is provided which is secured to the outer end of the spool 106 for turning the spool, and the lever has projections 110 thereon to serve as pointers to indicate whether the valve is in the on or off position. As shown, the lever 108 is secured to the spool 106 by means of machine screws 112, and it will be appreciated that the lever 108, by rotating it and/or turning it over, may be installed in any one of four positions 90° apart.

When the valve is in the open position illustrated in FIGS. 2, 5 and 6 fluid is admitted from conduit 54 to the hollow shaft 88 and thence into the toroidal chambers of the fluid retarder. When the valve is turned to the off position shown in FIG. 7, it is still important to provide lubrication of the ball bearing assembly 113 of the fluid retarder, which journals the shaft 88 in housing 79, and this is accomplished by means of an opening 114 which continuously admits a small amount of fluid to the retarder when the valve is in the off position, as illustrated. A similar opening 116 lubricates oil seal 117. It is also important to the proper operation of the retarder that provision be made for admitting air to the retarder chamber when it is desired to expel fluid from the retarder. It will be appreciated that if this were not done, the discharge of fluid from the retarder would tend to produce a vacuum in the retarder chambers and thereby prevent the proper and prompt discharge of the fluid. Such venting is accomplished by means of an opening 118 in the bottom of the housing 102 of the control valve which communicates with the interior of the retarder, and is connected by means of a conduit 120 (see FIGS. 1 and 5) to the housing 13 of the transmission 12 above the fluid level in the transmission.

Figure 8:
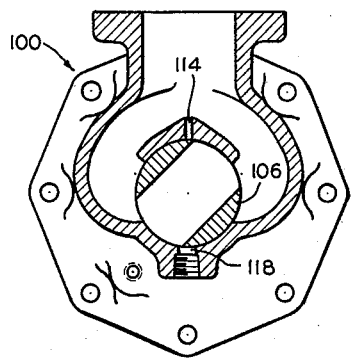
FIGURE 8 is the same as FIG. 6 except with the valve in an intermediate position.

FIG. 8 of the drawing shows the inlet control valve in an intermediate position between open and closed, and this is illustrative of the fact that the amount of retarding or braking action is controlled by varying the position of the inlet control valve 100. Fluid is discharged continuously from the retarder as explained in the following paragraph, and the amount of fluid contained by the retarder is controlled by varying the amount of opening of the inlet control valve; the retarding action is responsive to the amount of fluid in the retarder. When the inlet valve is fully open full retarding is provided, while less retarding action is provided by partially closing the control valve to secure the desired amount of retardation, and closing valve 100 completely stops the retarding action. Thus, an infinitely variable retarder is provided.

Figure 9:
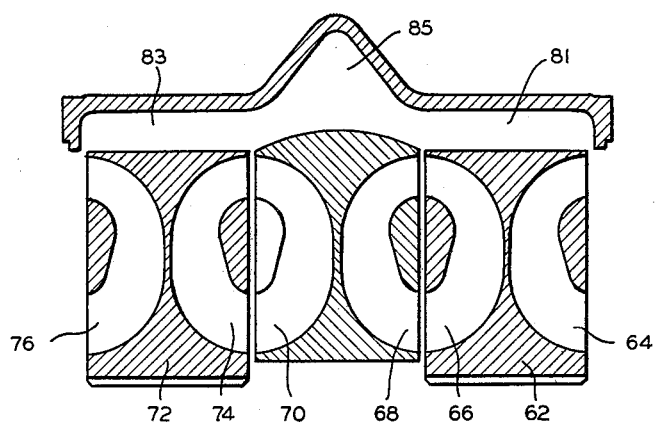
FIGURE 9 is a fragmentary sectional view taken longitudinally through the center line of the retarder but at a different angle than FIG. 2 to show the discharge passages from the individual retarder units.
Figure 10:
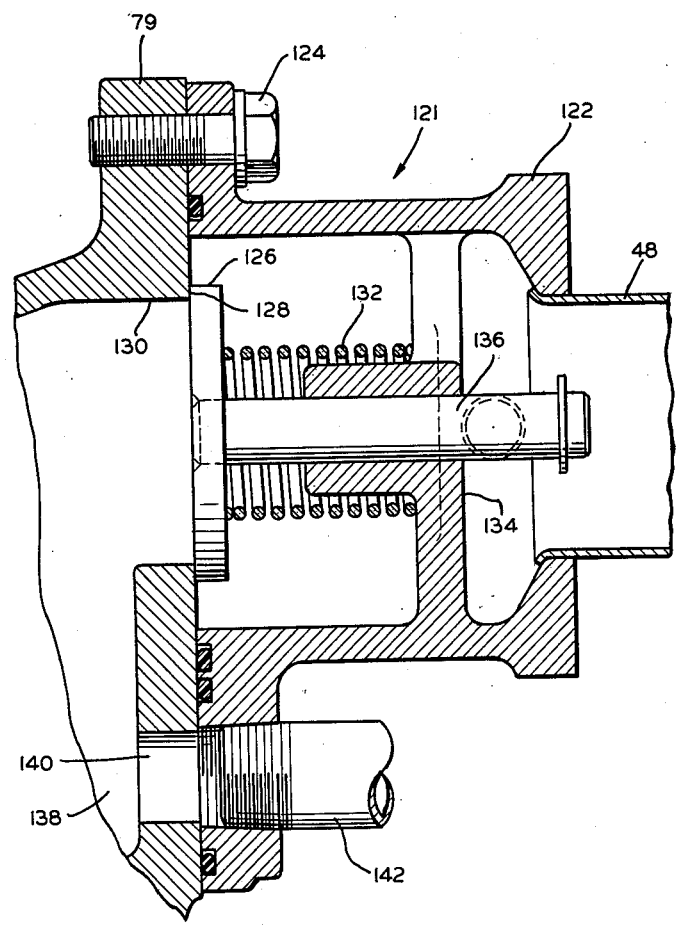
FIGURE 10 is a longitudinal sectional view of the outlet valve from the fluid retarder.

Fluid is discharged from the retarder through the outlet or discharge valve 121, shown in detail in FIG. 10 of the drawing, which acts as a one-way or check valve to prevent the return of fluid from line 48 into the retarder. FIG. 9 shows the manner in which the fluid in the retarder flows from the individual retarder units to the discharge valve. FIG. 9 is a fragmentary sectional view taken longitudinally through the center line of the retarder along a plane which is between the vertical plane of FIG. 2 and a slanted plane through the center line which would intersect the discharge valve. As shown in FIG. 9 the fluid flows from the toroidal chambers of the individual retarder units outwardly to chambers 81 and 83 (see FIG. 2) which are joined at 85 as shown in FIG. 9 in a passageway which leads to the discharge valve.

The discharge valve 121 comprises a housing portion 122 which is secured to the housing 79 of the fluid retarder in a suitable manner such as by a plurality of machine screws 124. The valve 121 includes a poppet member 126 which seats on a mating seat portion 128 which is formed around the edge of a circular opening 130 in the housing 79. The poppet member 126, when the retarder is not operating, is held in engagement with seat 128 by means of a spring 132 which is compressed between the poppet member 126 and a guide member 134 which extends inwardly from the outer wall of housing 122 and has a central opening therein in which is located a rod member 136 which carries the poppet member 126 at the end thereof. The spring 132 is chosen to provide for release of fluid from the retarder upon generation of pressure therein by braking operation, but when the retarder is not operating the spring 132 causes the valve 121 to close and prevent fluid from conduit 48 from entering the retarder. As mentioned previously, the conduit 48 as well as the remainder of the liquid circulating system from and to the retarder ordinarily is maintained at a pressure above atmospheric such as 25 lbs. per sq. in., thus fluid from conduit 48 would flow back into the retarder if it were not for check valve 121. It will be appreciated, of course, that there may be a momentary drop in pressure when the retarder is being filled because of rapid flow of liquid from conduit 54 into the retarder.

The valve structure just described provides for the release of fluid in considerable quantity during operation of the retarder, and after being released from the retarder the fluid circulates through conduits 48 and 46 and through the heat exchanger and then back again through conduit 50, and thence either into the fluid retarder again through conduit 54 or through conduit 52 for lubricating the transmission. This provides for continuous circulation and cooling of the fluid, as required, during retarder operation. However, the valve 121 is not effective to release small quantities of fluid to accomplish complete draining of the retarder or to provide for the disposal of small quantities of fluid which are admitted for lubricating purposes through the openings 114 and 116, previously described, in the inlet valve. Such small amounts of fluid are disposed of by draining them by gravity from a trap 138 in the housing of the retarder from which they pass through opening 140 into conduit 142 and thence back into the transmission housing.

While the invention as described and illustrated herein employs the control valve 100 at the inlet to the retarder to perform the throttling or varying the flow of liquid through the retarder in order to vary the retarding effect as desired, it will be appreciated that it is possible, without departing from the present invention, to utilize the inlet valve 100 as a shut-off valve and incorporate a separate throttling valve in the discharge from the retarder to accomplish the variation of the braking effort. The check valve 121 would still be required, but such a throttling valve could be associated with check valve 121 either upstream or downstream thereof.

If the volume of liquid contained by the housing of the transmission 12 is insufficient to supply the entire system including the retarder without unduly varying the level of liquid in the transmission housing, an accumulator or other auxiliary storage device as indicated by the dashed lines 144 in FIG. 1 may be added to the system. It will be appreciated that in a transmission such as illustrated at 12 it may be important to maintain the fluid level within certain limits in order to prevent under-lubrication if the level gets too low or over-lubrication if it gets too high, hence it may be necessary to employ such an auxiliary storage device in some cases. The auxiliary storage device indicated by the numeral 144, conveniently may be connected by a conduit 145 as shown in FIG. 1 to the bottom of the transmission casing 13 below the liquid level therein. The device 144 may include a piston 146 separating the liquid chamber 148 from an air chamber 150 on the opposite side of the piston. Then when the inlet control valve 100 is operated to admit liquid to the retarder, an air valve 152 may be operated simultaneously to admit air under pressure through line 154 to chamber 150 and force the liquid from chamber 148 into casing 13 for circulation in the liquid system. A spring 156 is provided in chamber 148 to restore piston 146 to its initial position to refill chamber 148 with liquid when the retarder control valve 100 and air valve 152 are closed again.

It will be apparent from the foregoing that this invention fulfills the objects stated previously. It provides an auxiliary braking system which is interrelated with the drive line components of the vehicle and which does not increase the length required in a vehicle for the torque converter and transmission when they are coupled as illustrated in the drawing, for the fluid retarder device is mounted on the transmission housing and fits in the space which is present anyway between the torque converter housing and the transmission housing. Since the fluid retarder acts through the transmission gearing, the size and cost of the retarder are minimized and the braking effort of the retarder is multiplied in accordance with the gear ratio of the transmission.

It will be appreciated that modifications may be made by those skilled in the art. It should be understood, therefore, that we intend to cover by the appended claims all such modifications which fall within the true spirit and scope of our invention.

We claim:
1. In combination, a change speed transmission including a casing adapted to contain fluid and a rotatable shaft projecting from the casing, a fluid retarder having a housing mounted on the said transmission casing and hydrodynamic braking elements at least one of which is connected to the said rotatable shaft, a pump, a heat exchanger, first fluid conduit means connecting the said transmission casing to the inlet of the said pump, second fluid conduit means connecting the outlet of the said pump and the outlet of the said fluid retarder to the inlet of the said heat exchanger, and third fluid conduit means connecting the outlet of the said heat exchanger to the said transmission casing and to the inlet of the said retarder.

2. A control system for a fluid retarder having an inlet and a separate outlet, comprising a fluid storage device, a pump, a fluid pressure regulator, a heat exchanger, a control valve for the inlet to the retarder, first fluid conduit means interconnecting the said fluid storage device with the inlet of the said pump, second fluid conduit means interconnecting the outlet of the said pump with the said fluid pressure regulator and the fluid pressure regulator with the inlet of the said heat exchanger, third fluid conduit means interconnecting the outlet of the fluid retarder with the inlet of the said heat exchanger, and fourth fluid conduit means interconnecting the outlet of the said heat exchanger with the said fluid storage device and the said control valve.

3. A control system for a fluid retarder having a housing surrounding a plurality of hydrodynamic braking elements and separate inlet and outlet openings in the housing, comprising a change speed transmission having a casing for containing fluid and a rotatable shaft projecting from the said casing, means mounting the housing of the fluid retarder on the said transmission casing, additional means connecting one of the hydrodynamic braking elements to the said rotatable shaft, a pump, a fluid pressure regulator, a heat exchanger, a control valve at the inlet opening to the said retarder, a pressure responsive valve at the outlet opening from the retarder, first fluid conduit means interconnecting the said casing of the transmission with the inlet of the said pump, second fluid conduit means interconnecting the outlet of the said pump with the said fluid pressure regulator and the fluid pressure regulator with the inlet of the said heat exchanger, third fluid conduit means interconnecting the outlet of the fluid retarder with the inlet of the said heat exchanger, and fourth fluid conduit means interconnecting the outlet of the said heat exchanger with the said casing of the transmission and the said control valve.

4. In combination, a fluid retarder comprising a housing, a plurality of hydrodynamic braking elements within the said housing forming at least one torus chamber, a rotatable shaft having at least one of the said braking elements secured thereto, the said shaft having a longitudinal passageway therein extending from one end and a lateral opening through the shaft wall connecting said passageway with the said torus chamber, the said housing having an inlet opening therethrough adjacent the said one end of the shaft and an outlet opening therethrough; a change speed transmission having a casing for containing fluid and a rotatable shaft projecting from the said casing; means mounting the housing of the said fluid retarder on the said transmission casing; additional means connecting the said fluid retarder shaft to the said transmission shaft; a control valve mounted at the said one end of the retarder housing for selectively admitting fluid to the retarder through the said inlet opening; a pressure responsive discharge valve mounted on the said housing to normally close the said outlet opening and arranged to discharge fluid from the said retarder upon the occurrence of a predetermined fluid pressure therein; a pump; first fluid conduit means interconnecting the said transmission casing with the inlet of the said pump; a fluid pressure regulator; second fluid conduit means interconnecting the outlet of the said pump with the inlet of the said pressure regulator; a heat exchanger; third fluid conduit means interconnecting the outlet of the said pressure regulator with the said heat exchanger; fourth fluid conduit means interconnecting the said discharge valve with the inlet to the said heat exchanger; and fifth fluid conduit means interconnecting the outlet of the said heat exchanger with the said control valve and the said transmission casing.

5. In combination, a fluid retarder comprising a housing, a plurality of pairs of bladed stator and rotor members forming a plurality of individual retarder units, each pair forming a toroidal chamber made up of an annular chamber in each wheel approximately semicircular in cross-section with radially extending blades therethrough and the two confronting wheels carrying a pair of core rings which coact to provide a core for the said toroidal chamber, a hollow rotatable shaft having the said rotor elements secured thereto, the said shaft having a longitudinal passageway therein extending from one end and lateral openings through the shaft wall connecting the said passageway with the said toroidal chambers respectively, the said housing having an inlet opening therethrough adjacent the said one end of the shaft and an outlet opening therethrough on the periphery; a change speed transmission having a casing for containing fluid and a rotatable shaft projecting from the said casing; means mounting the housing of the said fluid retarder on the said transmission casing; additional means connecting the said fluid retarder shaft to the said transmission shaft; a control valve mounted at the said one end of the retarder housing for selectively admitting fluid to the retarder through the said inlet opening; a pressure responsive discharge valve mounted on the said housing to normally close the said outlet opening and arranged to discharge fluid from the said retarder upon the occurrence of a predetermined fluid pressure therein; a pump having an inlet and an outlet; first fluid conduit means interconnecting the lower portion of the said transmission casing with the inlet of the said pump; a fluid pressure regulator having an inlet and an outlet; second fluid conduit means interconnecting the outlet of the said pump with the inlet of the said pressure regulator; third conduit means for transmitting a portion of the fluid entering the regulator at a first relatively high regulated pressure to the said transmission casing; a hydrodynamic torque converter; means for directing the remaining portion of the said fluid entering the said pressure regulator through the said hydrodynamic torque converter and back to the said pressure regulator, the said pressure regulator including means for maintaining the pressure in the said torque converter at a second lower regulated pressure; a heat exchanger having an inlet and an outlet; fourth conduit means interconnecting the outlet of the said pressure regulator with the inlet of the said heat exchanger; fifth fluid conduit means interconnecting the said discharge valve with the inlet to the said heat exchanger; sixth fluid conduit means interconnecting the outlet of the said heat exchanger with the said control valve; seventh fluid conduit means interconnecting the said sixth conduit means with the upper portion of the said transmission casing; and additional regulator valve means associated with the said seventh fluid conduit means for maintaining a third still lower regulated pressure in said heat exchanger and the said fourth, fifth, sixth and seventh fluid conduit means.

6. In an auxiliary braking system for a motor vehicle having a driving member, a transmission including a fluid containable casing, a fluid friction brake comprising a stationary bladed member and a rotatable bladed member cooperable therewith and providing a fluid chamber therebetween, the said rotable member being geared to the driving member of the vehicle to operate at a multiple speed ratio relative thereto, a cooling fluid circulating system for the said brake including inlet and outlet conduits from the brake and a heat exchanger and also including the said transmission casing, a conduit connecting the said heat exchanger to the said inlet conduit for the brake and to the said transmission casing, selective valve means at the inlet to the said brake for controlling the fluid supplied to the brake, and pressure responsive valve means at the outlet from the said brake for releasing fluid from the brake.

7. An auxiliary braking system for a motor vehicle comprising, a transmission including a fluid containable casing, an input shaft, an output shaft, gear and clutch means providing for driving the said output shaft from the said input shaft at a plurality of different gear ratios, and a brake shaft projecting from the said casing and interconnected with the said gear and clutch means; a fluid retarder comprising a housing secured to the said transmission casing, a plurality of hydrodynamic braking elements within the said housing, and a rotable shaft secured to the said brake shaft on the said transmission and having at least one of the said hydrodynamic braking elements mounted thereon; a fluid circulating system including inlet and outlet conduits from the said fluid retarder, inlet and outlet conduits from the said transmission casing, a heat exchanger and a conduit connecting the said heat exchanger both to the said inlet conduit for the brake and to the said inlet conduit for the transmission casing; a pump connected in the said fluid circulating system for circulating fluid to the said retarder and through the said transmission casing, selective valve means at the inlet to the said retarder for variably controlling the fluid admitted to the said retarder, and pressure responsive one-way valve means at the outlet from the said retarder providing for discharge of fluid from the fluid retarder and preventing fluid from entering the fluid retarder through the said outlet therefrom.

References Cited in the file of this patent
UNITED STATES PATENTS

| | | |
|---|---|---|
| 2,827,989 | Christenson | Mar. 25, 1958 |
| 2,864,473 | Christenson et al. | Dec. 16, 1958 |
| 2,946,416 | Snoy | July 26, 1960 |